United States Patent [19]

Fujisawa et al.

[11] Patent Number: 4,872,745
[45] Date of Patent: Oct. 10, 1989

[54] COVER FOR CAR LAMPS

[75] Inventors: Norio Fujisawa; Toshishige Sakamoto; Toshiyasu Ito; Junichi Shimada, all of Aichi, Japan

[73] Assignee: Toyoda Gosei Co., Ltd., Nishikasugai, Japan

[21] Appl. No.: 156,839

[22] Filed: Feb. 17, 1988

[30] Foreign Application Priority Data

Feb. 18, 1987 [JP] Japan .................. 62-022989

[51] Int. Cl.$^4$ .......................... G02F 1/17; G02F 1/13
[52] U.S. Cl. .................. 350/357; 350/331 R
[58] Field of Search .......... 350/357, 334, 330, 331 R, 350/353, 355

[56] References Cited

U.S. PATENT DOCUMENTS

| 3,774,988 | 11/1973 | Rogers | 350/357 X |
| 4,550,982 | 11/1985 | Hirai | 350/357 |
| 4,664,934 | 5/1987 | Ito et al. | 427/38 |

FOREIGN PATENT DOCUMENTS

| 0091431 | 5/1983 | Japan | 350/357 |
| 1086733 | 5/1986 | Japan | 350/357 |
| 0328017 | 5/1930 | United Kingdom | 350/357 |

Primary Examiner—Eugene R. Laroche
Assistant Examiner—Nathan W. McCutcheon
Attorney, Agent, or Firm—Cushman, Darby & Cushman

[57] ABSTRACT

A cover for car lamps comprising a transparent base and a transparent element with variable coloring intensity capable of coloring and discoloring by electric conduction, disposed on at least a part of the base.

6 Claims, 3 Drawing Sheets

COVER FOR CAR LAMPS

FIELD OF THE INVENTION

The present invention relates to covers for car lamps, for example, front lamps, rear lamps, side lamps and others.

DESCRIPTION OF THE RELATED ART

A cover for automobile headlights which is customarily in use was designed so as to improve the aerodynamic properties of the automobile. This cover is made of transparent resin and has a smooth streamlined curve conforming with the configuration of the car body.

There is also a well-known coverless type of headlight called a retractable headlight. This type of headlight rises from the car body on operation.

However, in the case of the lamp cover made of synthetic resin, there is little room for artistic design improvement as the lamp is always visible from the outside. In the case of a retractable headlight, making the headlight rise from the car body requires a complex mechanism.

SUMMARY OF THE INVENTION

An objective of the present invention is to provide a cover for car lamps that is capable of changing to a desired color according to the applied voltage.

A second objective of the present invention is to provide a cover for car lamps the color of which can be made to be the same as that of the car body when the lamp is not in use.

A third objective of the present invention is to provide a cover for car lamps that can allow more room for artistic designs.

A fourth objective of the present invention is to provide a cover for car lamps that can improve the aerodynamic properties of the automobile.

A fifth objective of the present invention is to provide a cover for car lamps that does not require a complex mechanism for operation.

To realize the above-mentioned objectives, the present invention comprises a transparent base and a transparent element with variable coloring intensity. This element is capable of coloring and discoloring by electric conduction and is disposed on at least a part of the base.

Other objectives of the present invention will become apparent with an understanding of the embodiments described later and the appended claims. Further, many advantages not mentioned in this specification will be obvious to one skilled in the art upon application of the present invention.

DETAILED DESCRIPTION OF THE PREFERRED EMBODIMENTS

Next, a preferred embodiment of the present invention will be described with reference to FIG. 1 to FIG. 4.

Figure 1:
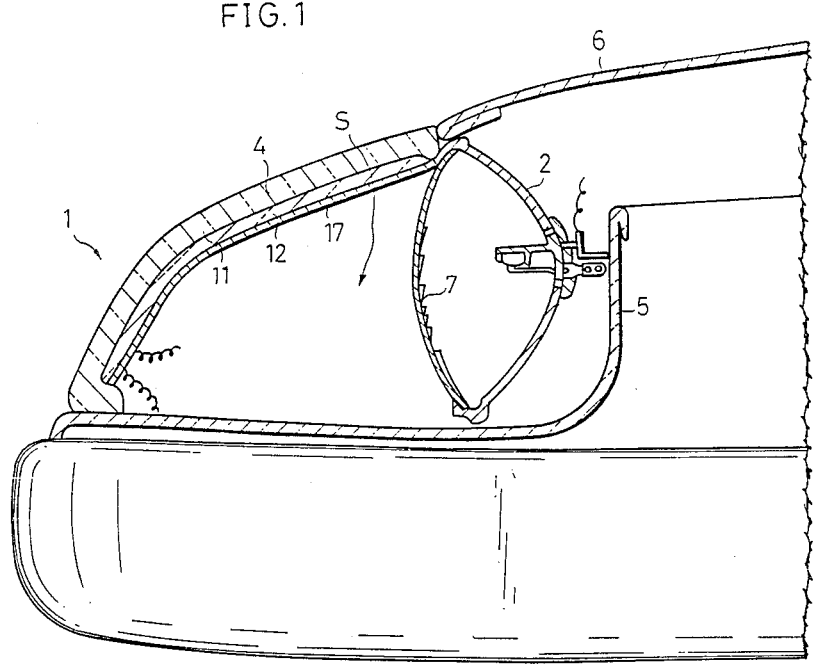
FIG. 1 is a cross sectional view showing a lamp cover on the front side of a car in an embodiment of the present invention.
Figure 3:
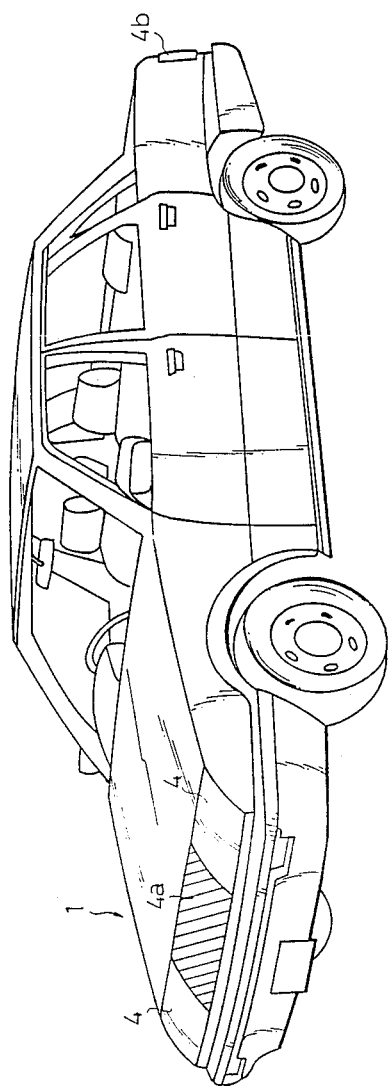
FIG. 3 is a perspective view showing an automobile equipped with a lamp cover of the present invention.
Figure 8:
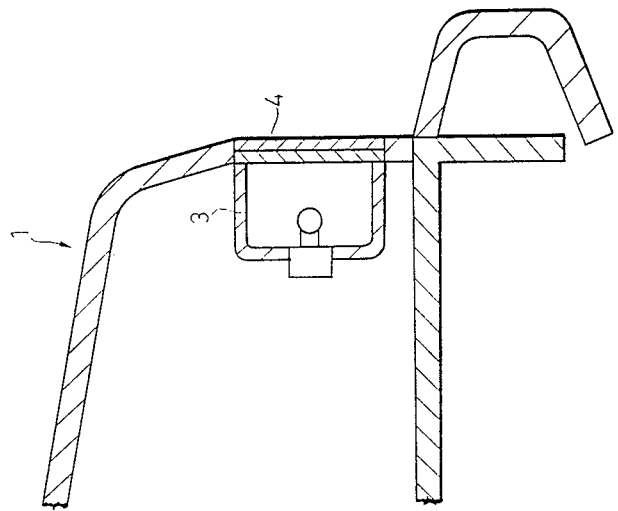
FIG. 8 is a cross sectional view showing a lamp cover on the rear side of a car.

A cover for car lamps (hereinafter referred to as lamp cover) is used to cover the front lamps 2, for example, headlights, cornering lights, fog lights, and others, and the rear lamps 3, for example, stop lights, back lights, and others, of a car 1 as shown in FIGS. 1, 3, and 8.

For example, in the case of the front lamp 2, the lower and upper ends of the lamp cover 4 are fixed by means of well-known methods to the body front plate 5 and bonnet 6 of the car in front of the front lamp 2, as shown in FIG. 1. A space S is formed between the lamp cover 4 and the lens 7 of the front lamp 2.

Further, a grill cover 4a having essentially the same structure as that of the lamp cover 4 is disposed over the grilled part of the car between the right and left front lamps 2.

Figure 2:
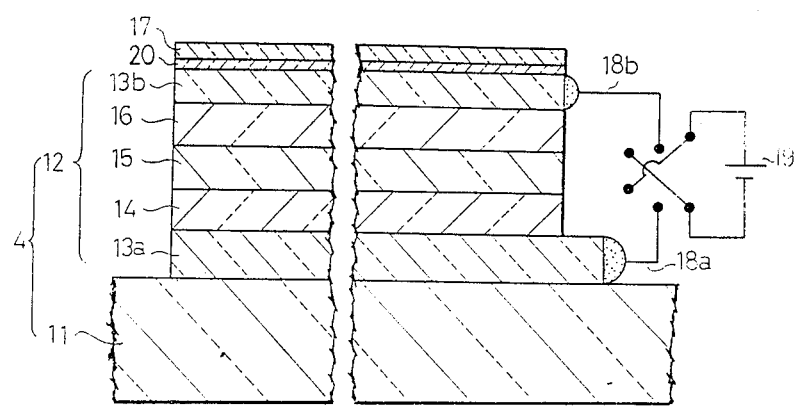
FIG. 2 is a partial cross section of the electrochromic element.

As shown in FIG. 2, the lamp cover 4 and the grill cover 4a in this embodiment essentially consist of a transparent base 11 made of polycarbonate, polymethyl methacrylate, and others, an electrochromic element 12 which is a transparent element with variable coloring intensity, directly disposed in layered form on one surface of said base 11 and the outer surface of the electrochromic element 12 being covered by a coating layer 17 via an adhesion layer 20.

As long as the base 11 maintains its transparency, its color will match that of the car body. Otherwise, it can be made colorless or colored as desired.

The electrochromic element 12 comprises an electrode 13a directly in contact with the base 11, an oxidative color-forming layer 14 on top of the electrode 13a, and consecutively in the following order, an electrolyte 15, a reductive color-forming layer 16, and an electrode 13b.

Lead wires 18a and 18b are connected to the electrodes 13a and 13b respectively, allowing current to flow from the power supply 19.

In this embodiment, the electrodes 13a and 13b are made of transparent electroconductive films, specifically ITO, which is a mixture of metal oxides $In_2O_3$:-$SnO_2$ with weight ratio 95:5. Further, $IrO_5$ is used for the oxidative color-forming layer 14, $Ta_2O_5$ for the electrolyte 15, and $WO_3$ for the reductive color-forming layer.

The electrode 13a, oxidative color-forming layer 14, electrolyte 15, reductive color-forming layer 16 and electrode 13b of the electrochromic element 12 are disposed in layered form on the base 11 according to the following procedure.

(1) Washing of the base 11

The base 11 is placed in a neutral detergent solution and washed using supersonic waves. Afterwards, it is rinsed with distilled water and air-dried with clean air.

(2) Forming the electrochromic element 12

(a) Forming the electrode 13a

The base 11, with an unmasked part to which the electrochromic element 12 is applied, is placed on the upper part of the interior of an ion plating device and an ITO is vaporized by exposure to an electron beam. The vaporized ITO is ionized by a glow discharge and the electrode 13a is formed on the base 11. A lead wire 18a is then connected to the electrode 13a. The interior of the aforementioned ion plating device is kept at a reduced pressure and filled with inert gas.

(b) Forming the oxidative color-forming layer 14

Using the same ion plating device, an oxidative color-forming layer 14 is again formed on the surface of the electrode 13a on the base 11. The procedure is the same as that in forming the electrode 13a.

(c) Forming the electrolyte 15

Using a $Ta_2O_5$ tablet as raw material, an electrolyte 15 is formed on the surface of the oxidative color-forming layer 14.

(d) Forming the reductive color-forming layer 16

Under an argon gas environment, a reductive color-forming layer 16 is formed on the surface of the electrolyte 15.

(e) Forming the electrode 13b

With the same procedure used in forming the electrode 13a, an ITO electrode 13b is formed on the surface of the reductive color-forming layer 16. A lead wire 18b is connected to this electrode 13b.

The thickness of the various layers comprising the solid electrochromic element 12 thus formed according to the procedure described above is shown in the following table.

| layer | material | thickness (Å) |
|---|---|---|
| electrode | ITO | 2000 |
| oxidative color-forming layer | $IrO_x$ | 200 |
| electrolyte | $Ta_2O_5$ | 5000 |
| reductive color-forming layer | $WO_3$ | 6000 |
| electrode | ITO | 2000 |

When a driving voltage of 1.4V from the power supply 19 is applied on the electrodes 13a and 13b of the electrochromic element 12 formed as described above, a redox reaction between the oxidative color-forming layer 14 and the reductive color-forming layer 16 is induced. The color and transmittancy of the two layer 14 and 16 then changes and the electrochromic element 12 itself entirely turns into and maintains a dark gray color. When the polarity of the driving voltage is reversed, the lamp cover 4 and the grill cover 4a loses the gray color and return to their original color and become transparent.

The operation and effects of the present invention are described next.

The lamp cover 4 having the structure previously described is attached with screws, etc. in front of the front lamps 2 and rear lamps 3 of a car 1 as shown in FIGS. 1 and 8. Thus, the lamp cover 4 in this embodiment can be easily installed in a car 1.

By designing the base 11 in such a way as to match the color and conform with the configuration of the body of a car 1 and installed in front of the front lamps 2 and rear lamps 3, it will enhance the artistic design of the front and rear parts, etc. of the car 1.

Figure 4:
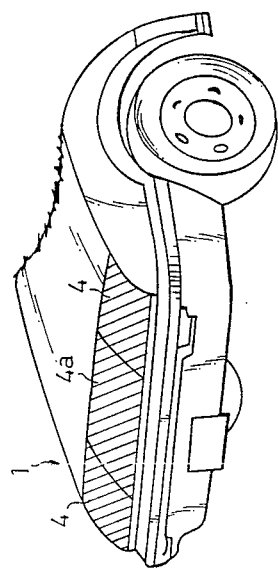
FIG. 4 is a perspective view showing a front lamp cover after coloring.

When the car 1 is running during daytime and electric current is made to flow through the electrochromic element 12, even if this flow of current is cut, the coloring intensity of the electrochromic element 12 still changes according to the applied voltage as shown in FIG. 4. Therefore the lamp cover 4 and grill cover 4a can be made to become nontransparent and match the color of the car body.

When the car 1 is running during nighttime, by reversing the polarity of the electrodes of the power supply 19 of the electrochromic element 12 when the front lamps 2 are turned on, a reverse redox reaction occurs in the electrochromic element 12 and the electrochromic element 12 becomes essentially transparent. The front lamps 2 within the transparent lamp covers 4 can thus function normally.

Hence with the present invention, compared to the lamp cover made of transparent resin customarily in use, there is more freedom in terms of artistic design improvement. Further, there is no need for a complex mechanism as required in retractable lamps.

The scope of the present invention is not limited to the described embodiment and can be applied in the following examples.

Figure 5:
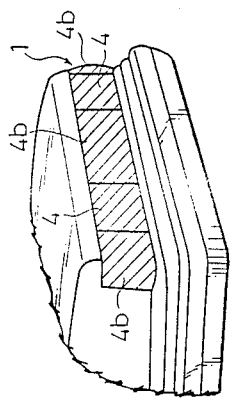
FIG. 5 is a perspective view showing a rear lamp cover after coloring.
Figure 6:
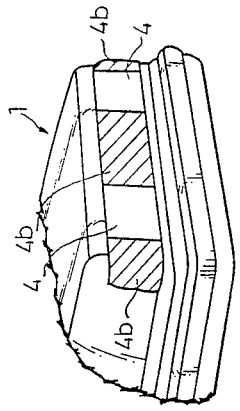
FIG. 6 is a perspective view showing a rear lamp cover in its transparent state.

(1) As shown in FIGS. 5 and 8, a lamp cover 4 and tail cover 4b may be installed almost entirely at the tail of a car 1 in the same manner described in the embodiment and may be designed to have a color conforming with that of the car body. Also, the lamp covers 4 of the rear lamps 3 can be made transparent when running during nighttime as shown in FIG. 6.

Therefore, as shown in FIGS. 3, 4, 5, 6 and 8, a lamp cover 4 may be installed in part of the car other than the front lamps 2 and rear lamps 3 and make the coloring intensity of only the lamp cover vary.

(2) The color of the lamp cover 4 after coloring can be made to vary according to the type of lamp used. For example, the lamp cover 4 installed in front of the stop lights can be made to match the color of the car body normally and made to turn red during nighttime. It can also be colored by using red filter.

(3) Aside from the material used in the described embodiment, $In_2O_3$, $SnO_2$ or Au and others may be used for the electrodes 13a and 13b.

(4) Aside from the materials used in the described embodiments, $Cr_2O_3$, $Ir(OH)_x$, $Ni(OH)_x$, NiO, Ni, $Rh(OH)_x$, RhO, $Ru(OH)_x$ and others may be used for the oxidative color-forming layer 14 to obtain different colors.

(5) For the material for the electrolyte 15, one may select among types that let ions pass while blocking electrons. Aside from the one used in the described embodiment, other examples are LiF, $SiO_2$, $ZrO_2$, $MgF_2$, $CaF_2$, $ZrO_2$, $Al_2O_3$, $Y_2O_3$, Na-$\beta$-alumina, $Li_3N$-($Li^+$) and others.

(6) Aside from the material used in the described embodiment, $TiO_2$, $MoO_3$, $Nb_2O_5$ and others may be used for the reductive color-forming layer 16. The respective positions of the reductive color-forming layer 16 and the oxidative color-forming layer 14 as described in the embodiment may be interchanged.

Figure 7:
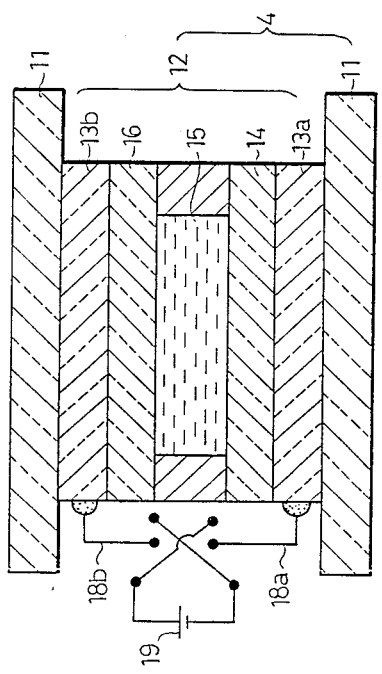
FIG. 7 is a cross sectional view showing another structure of the electrochromic element.

(7) As in the electrochromic element shown in FIG. 7, aside from the solid type, a color-forming layer made of electroconductive polymer such as polyanyline and others, an organic color-forming layer made of viologens, a diphtalocyanine complex color-forming layer and an oxidative color-forming layer made of modified polymer can be used as an oxidative color-forming layer 14. A "modified polymer" is a polymer such as polystyrene modified by tetratsiaflubaren (TTF), and also includes derivatives of TTF (see, Hiroshi Morita, "Latest Trend of Electrochromic Material Development," Material Report Review, December, 1982). Further, for the electrolyte 15, an electrolytic solution made of inorganic acid, metal salt thereof or water of ammonium salt or an organic solution can be used. Thus, the electrochromic element can either be a solution type using an electrolytic solution, or a semi-solid type with an electrolyte that is semi-solid. In some cases, a mixture of both types can be used. Other organic color forming-layers may be used to obtain various colors.

(8) A color liquid crystal can be used as a transparent element with variable coloring intensity.

(9) The transparent element with variable coloring intensity mentioned above can be disposed on the lens 7 of the lamp, on a part of the front of the car 1 or on a part of the lamp cover 4.

What is claimed is:

1. A cover for car lamps comprising:
a transparent base, and
a transparent element with variable coloring intensity, the color being controlled by electric conduction, disposed on at least a part of said base, said transparent element being substantially nontransparent and colored when said lamps are turned off and substantially transparent and colorless or disclosed when said lamps are turned on.

2. A cover for car lamps as set forth in claim 1, wherein said transparent element with variable coloring intensity is an electrochromic element or a color liquid crystal.

3. A cover for car lamps as set forth in claim 2, wherein said electrochromic element is formed by ion plating method and is provided with an adhesion layer and a coating layer.

4. A cover for car lamps as set forth in claim 2, wherein said electrochromic element comprises a first electrode, an oxidative color-forming layer, an electrolyte, a reductive color forming-layer and a second electrode consecutively piled together.

5. A cover for car lamps as set forth in claim 4, wherein said oxidative color-forming layer is a material chosen from the following: $IrO_x$, $Cr_2O_3$, $Ir(OH)_x$, $Ni(OH)_x$, $NiO$, $Ni$, $Rh(OH)_x$, $RhO$, and $Ru(OH)_x$, said electrolyte is a material chosen from the following: $Ta_2O_5$, $LiF$, $SiO_2$, $ZrO_2$, $MgF_2$, $CaF_2$, $Al_2O_3$, $Y_2O_3$, $Na\text{-}\beta\text{-alumina}$, and $Li_3N(Li+)$, and said reductive color-forming layer is a material chosen from the following: $WO_3$, $TiO_2$, $MoO_3$, and $Nb_2O_5$.

6. A cover for car lamps according to claim 1, wherein said cover is formed integrally with a grill of a car body.

* * * * *